US007678170B2

(12) United States Patent
Pfeiffer et al.

(10) Patent No.: US 7,678,170 B2
(45) Date of Patent: *Mar. 16, 2010

(54) FILTER SYSTEM

(75) Inventors: Frank Pfeiffer, Moensheim (DE); Pius Trautmann, Dingolfing (DE); Anders-Christian Hoppe, Oberstenfeld (DE)

(73) Assignee: Mann & Hummel GmbH, Ludwigsburg (DE)

( * ) Notice: Subject to any disclaimer, the term of this patent is extended or adjusted under 35 U.S.C. 154(b) by 729 days.

This patent is subject to a terminal disclaimer.

(21) Appl. No.: 11/403,947

(22) Filed: Apr. 14, 2006

(65) Prior Publication Data
US 2006/0260285 A1 Nov. 23, 2006

(30) Foreign Application Priority Data
Apr. 15, 2005 (DE) ........................ 10 2005 017 638

(51) Int. Cl.
*B01D 46/00* (2006.01)
(52) U.S. Cl. .............................. 55/498; 55/497; 55/502; 55/520; 210/493.4; 210/494.1; 210/497.1
(58) Field of Classification Search ................ 55/385.3, 55/481, 497, 502, 511, DIG. 31, 498, 508, 55/490, 520; 454/158; 210/493.4, 494.1, 210/497.1
See application file for complete search history.

(56) References Cited

U.S. PATENT DOCUMENTS 5,554,205 A * 9/1996 Ernst et al. ................. 55/385.3
5,660,608 A * 8/1997 Bartholome ................. 55/498
5,902,364 A * 5/1999 Tokar et al. ................. 55/498
6,322,602 B2 11/2001 Engel et al.
6,610,126 B2 * 8/2003 Xu et al. ..................... 95/273
6,638,332 B1 * 10/2003 Schmitz et al. .............. 55/392
6,783,565 B2 * 8/2004 Gieseke et al. ............. 55/385.3
6,814,771 B2 * 11/2004 Scardino et al. ............ 55/385.3
2002/0185008 A1 * 12/2002 Anderson et al. ............ 95/287
2005/0022669 A1 2/2005 Xu et al.
2005/0126137 A1 * 6/2005 Wang ........................... 55/498

FOREIGN PATENT DOCUMENTS
WO    WO 2004/020075 A2    3/2004

OTHER PUBLICATIONS
European Search Report dated Jul. 27, 2006 and an English translation of the pertinent portion (Seven (7) pages).

* cited by examiner

Primary Examiner—Duane Smith
Assistant Examiner—Minh-Chau T Pham
(74) Attorney, Agent, or Firm—Crowell & Moring LLP

(57) ABSTRACT

A filter element, especially for filtering intake air for an internal combustion engine, which filter element is composed of a coiled filter, through which a flow of air passes axially, and which has an annular gasket on at least one end face, the annular gasket being connected to the filter element by a welded, glued, extruded or fused connection, such that the annular gasket is inserted into a suitably constructed receptacle in a filter housing and radially and/or axially positions the coiled filter. The annular gasket is arranged directly on the end face of the coiled filter and is pressed axially and/or radially into the receptacle of the housing.

11 Claims, 2 Drawing Sheets

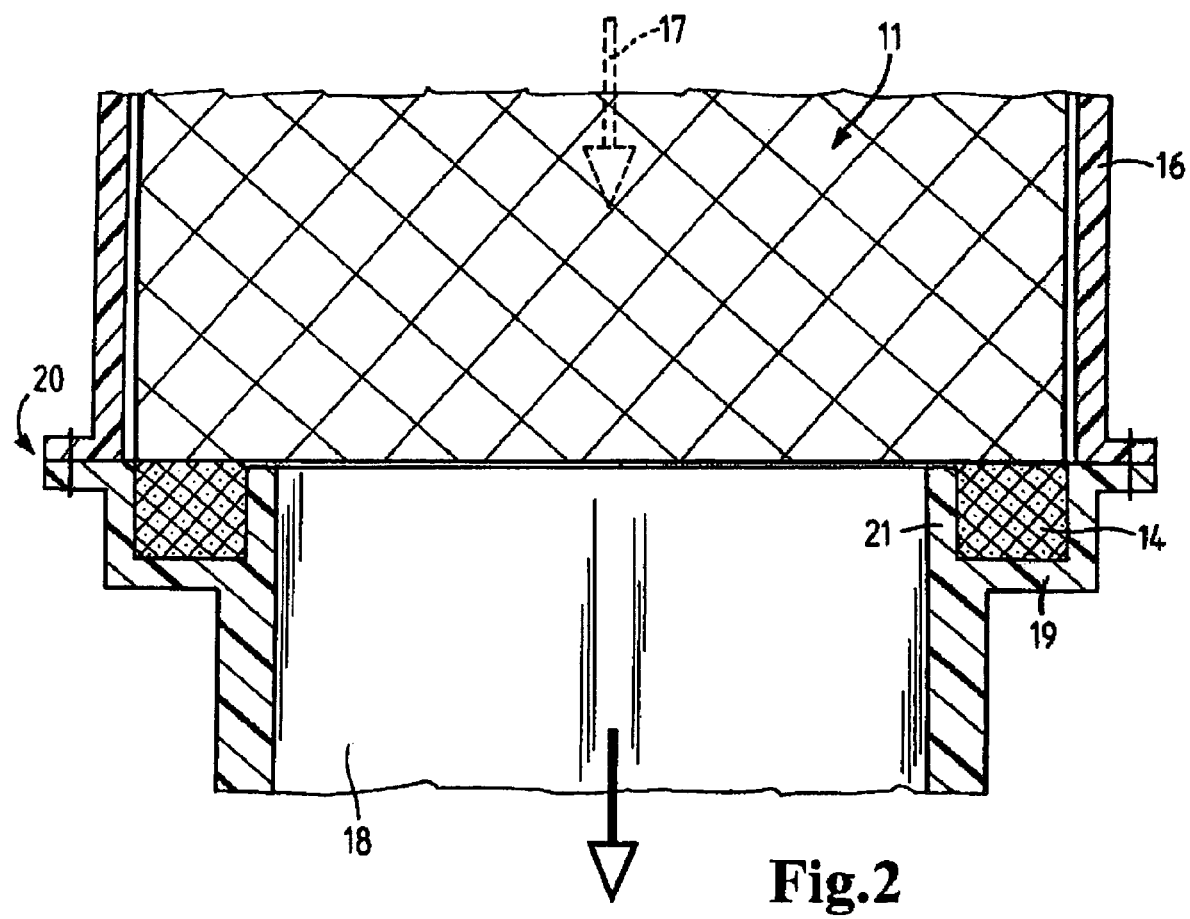

FILTER SYSTEM

BACKGROUND OF THE INVENTION

This invention relates to a coiled filter element configured for axial flow and to a filter system which utilizes such a filter element.

U.S. Pat. No. 6,322,602 discloses an air filter having a filter element through which air flows axially arranged in a cylindrical filter housing. The receptacle space for receiving the filter element in the filter housing is closed by a housing cover on one axial end face in the area of the oncoming flow side of the filter. This cover is detached to enable replacement of the filter element, whereupon the filter element is removed axially from the receiving space and can be replaced by a new filter element.

This embodiment has the disadvantage that in order to replace the filter element, the housing cover in the oncoming flow area must be removed, which initially requires dismantling the entire filter housing from its installed position, because the housing cover is connected to the inlet lines for supplying the air to be cleaned. Therefore, the filter element can be replaced only with a great deal of effort, which lengthens the time required for the maintenance and results in high maintenance costs.

Furthermore, WO 2004/020075 proposes a filter system for the intake air of an internal combustion engine in particular. This filter system comprises a housing with at least two housing parts and a filter element comprising a coiled filter, in which the housing parts can be separated in the area of the fastening of the filter element. The coiled filter has a profiled gasket on its circumference, which profiled gasket consists of an elastic band designed in the form of a bead-shaped bulge. The two housing parts can be clamped over this bulge.

SUMMARY OF THE INVENTION

It is an object of the present invention to provide an improved filter element which avoids the aforementioned disadvantages of the prior art.

Another object of the invention is to provide a filter element which can be manufactured at reasonable cost.

It is also an object of the invention to provide a filter system which improves upon the state of the art.

A particular object of the invention is to provide a filter system for a coiled filter element in which the filter element can be easily replaced.

These and other objects are achieved in accordance with the present invention by providing a filter element comprising a coiled filter, said coiled filter having axial flow through it and having an annular gasket on at least one end face, said annular gasket being joined to the coiled filter by a welded, glued, extruded or fused connection, in which the annular gasket is inserted into a suitably shaped receptacle of a housing and produces a radial and/or axial positioning of the coiled filter, and in which the annular gasket is arranged directly on the end face of the coiled filter and is pressed axially or radially into the receptacle of the housing.

In accordance with a further aspect of the invention, the objects are achieved by providing a filter system comprising a housing with at least two housing parts, and a filter element comprising a coiled filter having a profiled gasket on one axial end face, said profiled gasket comprising a resilient strip detachably received in a matingly shaped filter element receptacle in said housing.

An advantage of the present invention is that an annular gasket is disposed directly on the end face of the coiled filter and is pressed radially and/or axially into a one-piece receptacle of the housing.

The shape of the receptacle is determined by its one-piece design and is defined so that a certain pressing effect is achieved. The advantage of this defined form is the high process reliability in filtration operation.

In accordance with one embodiment of the invention, the receptacle of the housing is a chamber in the form of a groove, and the annular seal fills this groove completely.

According to this embodiment, the annular seal has a rectangular or square cross-sectional shape. There is also the possibility of constructing the annular seal to be conical, thereby facilitating insertion and removal of the annular seal into and from the groove, respectively.

In another preferred filter element embodiment the filter element is a coiled filter having a core in the form of a plastic strip or tube. If desired, this plastic strip or tube core may include a handle extending axially outward away from the coiled filter, thereby facilitating easy handling of the coiled filter.

The present invention also relates to a filter system, in particular for the intake air of an internal combustion engine, comprising a housing having at least two housing parts. The coiled filter arranged in the housing can be inserted into one housing part, i.e., into a correspondingly constructed receptacle in the housing for receiving the filter element.

According to a further refinement, a prefilter may be connected upstream from the filter element. Such a prefilter has the function of removing large particles and may primarily comprise a plurality of cyclones.

In accordance with another embodiment of the filter system, a secondary filter is connected downstream from the filter element. This secondary filter has the function of preventing entry of particles into the clean air line when the filter element is being replaced.

For simple assembly and dismantling of the filter element, in another embodiment the housing is divided into two parts, so that the connecting flange or connecting elements are situated adjacent the mounting area of the filter element.

These and other features of preferred embodiments of the invention, in addition to being set forth in the claims, are also disclosed in the specification and/or the drawings, and the individual features each may be implemented in embodiments of the invention either alone or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawing figures, in which:

FIG. 1b is a top view of the partial sectional view shown in FIG. 1a, and

FIG. 2 is a sectional view of a filter system according to the invention.

DETAILED DESCRIPTION OF PREFERRED EMBODIMENTS

Figure 1A:
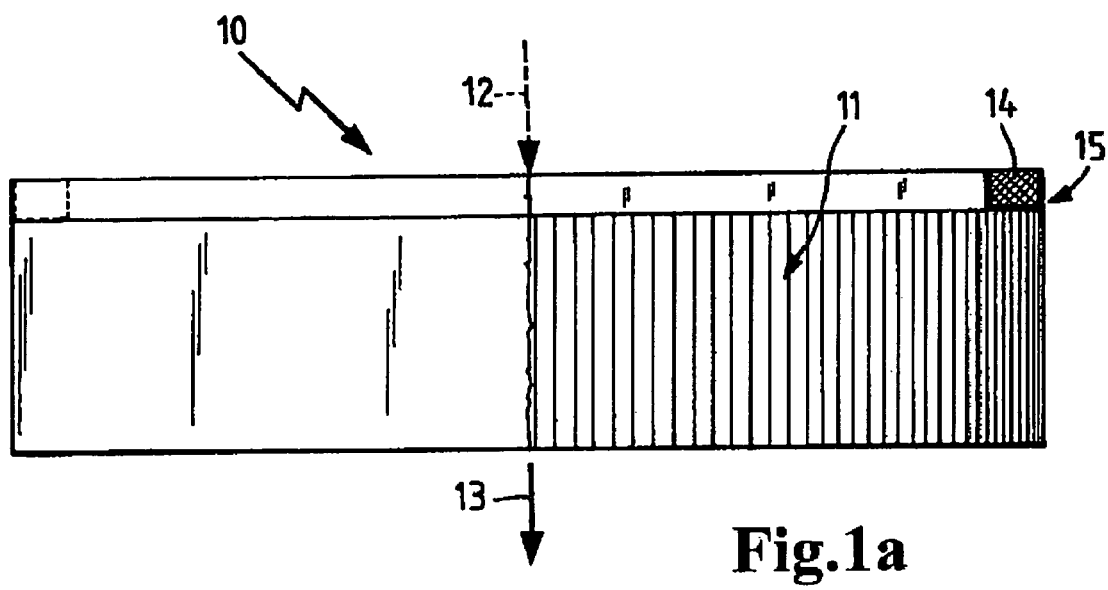
FIG. 1a is a partial sectional diagram of a filter element according to the present invention.

The diagram according to FIG. 1a shows a filter insert 10 with a filter coil 11 consisting of a pleated filter paper or a filter nonwoven.

Longitudinally aligned channels are formed by the pleated design. These channels are sealed at alternating ends, so that the incoming air flows into the channels that are open at the top as indicated by the arrow 12, flowing through the filter medium, i.e., the filter paper or filter nonwoven, into a laterally adjacent channel, whereby the air is filtered to clean it, then flowing out at the bottom as indicated by the arrow 13.

The entire filter coil is surrounded by a rectangular-shaped gasket 14 on the end. This gasket is made of polyurethane resin (PUR) foam or an elastomer, for example, and is adhesively bonded to the filter coil at the peripheral edges. The gasket has a gasket foot 15 which establishes the connection between the filter coil and the gasket 14 and ensures an optimum connection to the filter coil.

Figure 1B:
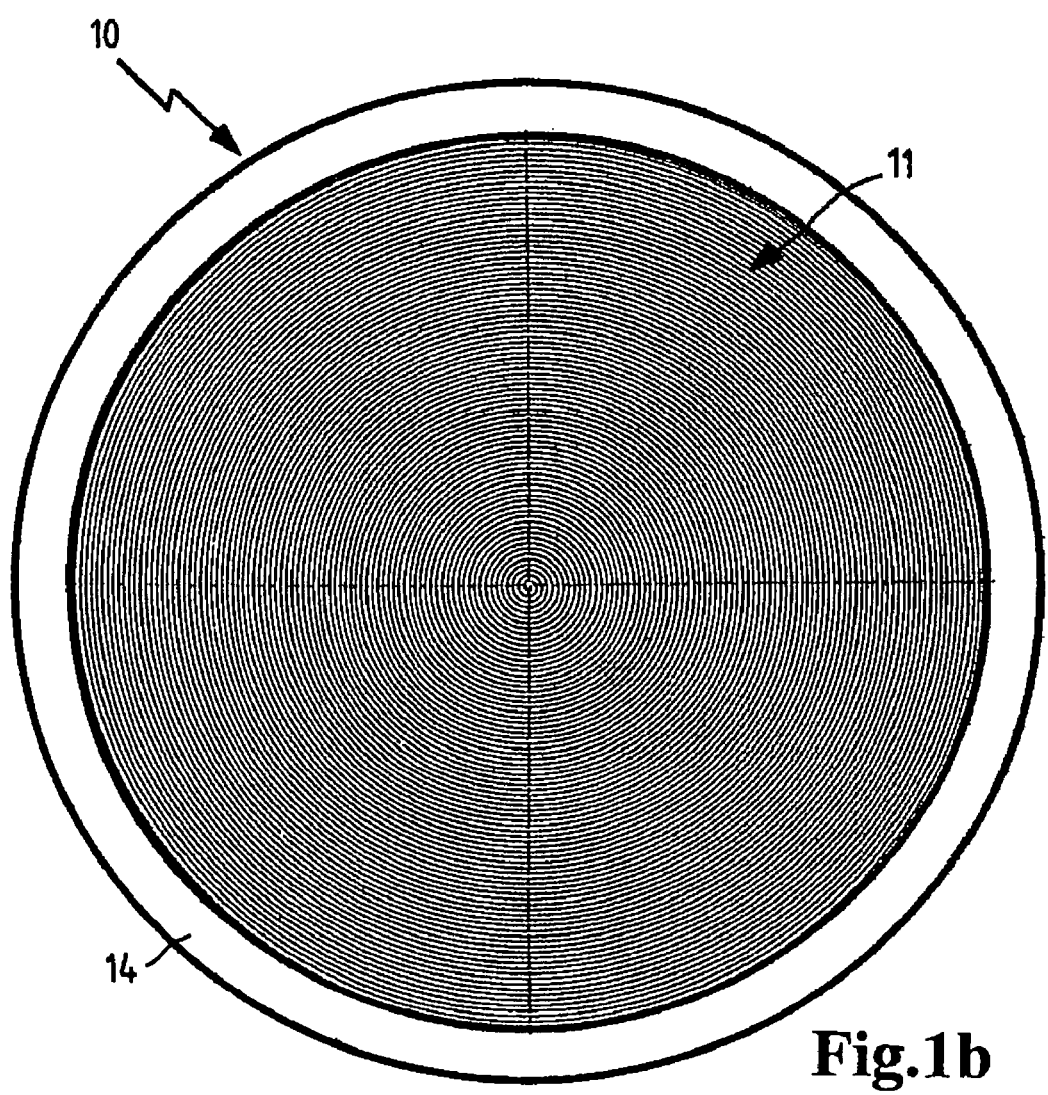

FIG. 1b shows in a view from above the filter coil 11 which is coiled up continuously starting from a filter core and carries the gasket 14 in the outer area.

Such an element is especially economical to manufacture. Such a filter element also has the advantage of providing a high effective filter area in a small volume. It is also possible to arrange a synthetic resin strip or a synthetic resin tube to serve as a core for the coiled filter element. If desired, this core may be provided with an axially extending handle to facilitate simplified insertion and/or removal of the coiled filter element in the filter system.

FIG. 2 shows a filter element 11 in a housing. In this view, parts corresponding to those shown in FIGS. 1a and 1b are identified by the same reference numerals. The housing 16 is made, for example, of synthetic resin (i.e., plastic) material and has a concentric shape like that of the filter element itself.

Air flows through the filter element as indicated by the arrow 17. Clean air flows down through the opening 18 shown here.

The filter element itself carries the gasket 14 on its axial end face. The gasket is matingly received in the housing part 19, which has a peripheral rib 21 in the internal area. As shown here, the housing is constructed in two parts, consisting of an upper housing 16 and the housing part 19, and is opened in the flange area 20 to facilitate replacement of the filter element 11.

The polyurethane resin gasket 14 is enclosed almost completely by the peripheral rib 21 such that a chamber is formed between the housing part 19 and the rib 21. Due to the resulting pressure on the gasket 14, the clean air side of the air filter is sealed off from the unfiltered air side. This sealing concept does not use a reinforcing frame made of synthetic resin material on the filter element and thus greatly simplifies the structure of the filter element and correspondingly reduces the cost of manufacturing the filter element.

As can be seen from the drawing, the parting plane between the two housing parts 16 and 19 lies adjacent the receptacle in which gasket 14 is received, thereby facilitating insertion and/or removal of the filter element.

If desired, a similar seal may also be used on the opposite axial end of the filter element, where it then serves to secure the position of the compact air filter in the air filter housing.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A filter element comprising a coiled filter, said coiled filter having axial flow through it and having an annular gasket on at least one end face, said annular gasket being joined to the coiled filter by a welded, glued, extruded or fused connection, in which the annular gasket is inserted into a suitably shaped receptacle of a housing and produces a radial and/or axial positioning of the coiled filter, wherein the annular gasket has a gasket foot that is carried by and secured directly on the end face of the coiled filter and is pressed axially or radially into the receptacle of the housing.

2. A filter element according to claim 1, wherein the filter element is pressed both axially and radially into the receptacle of said housing.

3. A filter element according to claim 1, wherein the receptacle of the housing comprises a groove enclosed on three sides, and the annular gasket completely fills said groove.

4. A filter element according to claim 1, wherein the annular gasket has a rectangular or square cross-sectional configuration.

5. A filter element according to claim 1, wherein the coiled filter has a synthetic resin strip or tube core, and the core includes a handle extending axially outward away from the coiled filter.

6. A filter element according to claim 1, wherein said filter element is arranged in an air intake tract of an internal combustion engine for filtering the intake air of the internal combustion engine.

7. A filter system comprising a housing with at least two housing parts, and a filter element comprising a coiled filter having a profiled gasket with a gasket foot that is carried by and secured directly on one axial end face of said filter element, said profiled gasket comprising a resilient strip detachably received in a matingly shaped filter element receptacle in said housing.

8. A filter system according to claim 7, further comprising a prefilter connected upstream from the filter element in the receptacle space for the filter element.

9. A filter system according to claim 6, further comprising a secondary filter connected downstream from the filter element in the receptacle space for the filter element.

10. A filter system according to claim 6, wherein the two housing parts can be separated in the area of the fastening of the filter element.

11. A filter system according to claim 6, wherein said filter system is interposed in an air intake tract for an internal combustion engine.

* * * * *